(12) United States Patent
Jiao et al.

(10) Patent No.: US 8,451,773 B2
(45) Date of Patent: May 28, 2013

(54) DYNAMIC LIGHTWEIGHT REMOTE MANAGEMENT OF HYBRID FEMTOCELL GATEWAYS

(75) Inventors: Hua Jiao, San Ramon, CA (US); Raghvendra Savoor, Walnut Creek, CA (US); Kapil Shrikhande, Berkeley, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 570 days.

(21) Appl. No.: 12/269,400

(22) Filed: Nov. 12, 2008

(65) Prior Publication Data

US 2010/0118844 A1 May 13, 2010

(51) Int. Cl.
*H04Q 7/00* (2006.01)

(52) U.S. Cl.
USPC .......................... 370/328; 455/422.1; 455/424

(58) Field of Classification Search
USPC ............ 370/331; 455/561; 375/260; 710/313
See application file for complete search history.

(56) References Cited

U.S. PATENT DOCUMENTS

| | | | |
|---|---|---|---|
| 7,516,211 B1 * | 4/2009 | Gourlay et al. | 709/224 |
| 2006/0002327 A1 * | 1/2006 | Kallio et al. | 370/328 |
| 2007/0254620 A1 * | 11/2007 | Lindqvist et al. | 455/403 |
| 2008/0244148 A1 * | 10/2008 | Nix et al. | 710/313 |
| 2009/0109922 A1 * | 4/2009 | Livanos | 370/331 |
| 2009/0296635 A1 * | 12/2009 | Hui et al. | 370/328 |
| 2010/0159895 A1 * | 6/2010 | Wallis et al. | 455/414.1 |

* cited by examiner

*Primary Examiner* — Jianye Wu
*Assistant Examiner* — Wanda Z Russell
(74) *Attorney, Agent, or Firm* — Turocy & Watson, LLP

(57) ABSTRACT

System(s) and method(s) that facilitate dynamic remote management of consumer premise devices comprising femtocells integrated into broadband gateways are presented. A communication network platform is associated with a consumer premise device(s) and can include a remote management component that facilitates dynamic and remote management of consumer premise devices in a wireless communication network. The remote management component monitors and measures desired parameters respectively associated with a consumer premise devices and employs remote controls to remotely adjust parameters based on predetermined optimization criteria. The remote management component calculates channel capacity based on measured channel signal-to-noise ratio to facilitate determining whether to hand off a current cell to another cell, wherein at least one cell is associated with a consumer premise device. The remote management component can generate and store Quality of Service profiles respectively associated with the consumer premise devices to facilitate remote management of the consumer premise devices.

25 Claims, 11 Drawing Sheets

DYNAMIC LIGHTWEIGHT REMOTE MANAGEMENT OF HYBRID FEMTOCELL GATEWAYS

TECHNICAL FIELD

The subject innovation relates to wireless communications and, more particularly, to dynamic lightweight management of hybrid femtocell gateways.

BACKGROUND

Femtocells—building-based wireless access points interfaced with a wired broadband network—are generally deployed to improve indoor wireless coverage, and to offload a mobility radio access network (RAN) operated by a wireless service provider. Improved indoor coverage includes stronger signal and improved reception (e.g., voice or sound), ease of session or call initiation, and session or call retention as well. Offloading a RAN can reduce operational and transport costs for the service provider since a lesser number of end users utilizes over-the-air radio resources (e.g., radio frequency channels), which are typically limited.

Coverage of a femtocell, or femto access point (AP), is generally intended to be confined within the bounds of an indoor compound (e.g., a residential or commercial building) in order to mitigate interference among mobile stations covered by a macro cell and terminals covered by the femto AP. Additionally, confined coverage can reduce cross-talk among terminals serviced by disparate, neighboring femtocells as well. Femtocells typically operate in licensed portions of the electromagnetic spectrum, and generally offer plug-and-play installation; e.g., automatic configuration of femto AP subsequent to femtocell subscriber registration with a service provider. Coverage improvements via femtocells also can mitigate customer attrition as long as a favorable subscriber perception regarding voice coverage and other data services with substantive delay sensitivity is attained. In addition, a richer variety of wireless voice and data services can be offered to customers via a femtocell since such service offerings do not rely primarily on mobility RAN resources.

It can be desirable to create hybrid femtocell gateways by integrating femtocells into broadband gateways (e.g., residential broadband gateways) supporting multiple WAN (e.g., DSL, 3G Wireless) and LAN (e.g., HPNA, Ethernet, 802.11g) interfaces. Integrating wireless and wireline services for the consumer market can realize significant benefits. However, there are technical challenges to realizing the potential of femtocells in areas of scalability, installation/activation management, performance management, inter-femtocell or base station hand-off, access control, crosstalk/interference management, and security and policy management.

For instance, conventionally, macro base stations are configured based on static spectrum management rules. When employing femtocells, it is desirable that femtocell spectrum management be more adaptive in the presence of interference from other femtocells or interference from macro base station cells. Also, current traditional wireless base stations management support only homogeneous services over a single wireless standard (e.g., 3G base station, etc.). With regard to femtocell management in an integrated gateway, it is desirable to employ multiple wireline and wireless protocol and policy management (e.g., WiFi, Digital Subscriber Line (DSL), Home Phoneline Network Association (HPNA)) that is more complex. Current macro base stations have optimized local management capabilities and embedded operational control channels that require memory and overhead, which is not practical in femtocells, as femtocells typically have more limited resources and are less expensive than macro base stations.

Moreover, home network services, such as security and policies, and crosstalk scenarios can be more diverse and challenging. It is therefore desirable to have the ability for remote diagnosis, proactive spectrum management, and customer care. Further, self-installation scenarios that hybrid femtocell gateways will have are new and different from traditional wireless models. It is desirable to have the ability for remote profile management and customer care.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) for dynamic lightweight remote management of hybrid femtocell gateways. The subject innovation can provide a lightweight framework to optimally manage hybrid femtocell gateways (e.g., hybrid residential femtocell gateways, hybrid consumer premises femtocell gateways) using profile assignment, remote performance data collection and dynamic control settings. In an aspect, a plurality of consumer premise devices can be in a wireless communication network. A consumer premise device can be a hybrid femtocell gateway that can integrate a femtocell into a broadband gateway (e.g., residential broadband gateway) supporting multiple WAN (e.g., Digital Subscriber Line (DSL), 3G Wireless) and LAN (e.g., Home Phoneline Network Association (HPNA), Ethernet, 802.11g) interfaces. The consumer premise device can facilitate wireless connection of communication devices (e.g., mobile wireless communication devices), such as a cellular phone or computer, to the consumer premise device when such communication devices are within range of the consumer premise device to facilitate wireless communication by the communication within the wireless communication network.

In another aspect, a communication network platform can facilitate dynamic remote management of consumer premise devices (e.g., hybrid femtocell gateways) associated (e.g., wirelessly connected) therewith in a wireless communication network. The communication network platform can comprise a remote management component that can facilitate measuring various parameters, such as Transmit Power, Channel Signal-to-Noise Ratio (SNR), Channel Bit Error Rate (BER), and Adjacent Channel Leakage ratio (ACLR), respectively associated with the consumer premise devices and/or respectively associated communication devices via web services. The remote management component can poll and calculate channel capacity of a consumer premise device based at least in part on measured Channel SNR. The remote management component also can evaluate and verify whether parameters, such as the channel SNR, BER, and/or ACLR, associated with a consumer premise device and/or associated communication devices are meeting predetermined system specifications. The remote management component also can detect and/or receive notification when a certain parameter(s), such as channel SNR, BER, or ACLR, associated with a consumer premise device and/or associated communication devices exceeds (or is below) a respective predetermined threshold level.

In yet another aspect, the remote management component can comprise one or more remote controls that can facilitate dynamically adjusting parameters, including Transmit Power, Blocking Settings, and/or Adjacent Channel Selectivity, associated with consumer premise device. The remote management component also can detect whether a particular consumer premise device is experiencing interference from a neighbor consumer premise device(s), and can employ an output power management control that can facilitate controlling output power (e.g., maximum output power) of consumer premise device to reduce or minimize interference between neighboring consumer premise device.

In still another aspect, the remote management component can facilitate remote management of Quality of Service (QoS) and Security. The remote management component can employ two tables for QoS and Security. For instance, a host table can store aggregate service bandwidth requirements and can list each locally connected consumer premise device by service with associated policy and security assignment. Another table that can contain all available interfaces (e.g., LAN, WAN).

In an aspect, assignment of communication devices to interface with the consumer premise device can be administered by the consumer premise device and the end user associated with the consumer premise device. The consumer premise device can have default selections related to assignment of communication devices for interface with the consumer premise device. Assignment of service bandwidth and Class of Service (CoS) policy for a consumer premise device can be automatically configured based at least in part on a remotely administered QoS profile associated with the consumer premise device (e.g., an iPhone can be assigned to a WiFi LAN interface, a 3G cellular phone can be assigned to a femto 3G Wireless interface, and a personal computer can be assigned to an Ethernet LAN interface, associated with the consumer premise device). To facilitate improved reliability, in the event that a particular interface is not available in a consumer premise device, the consumer premise device can select an alternate assignment option for a communication device desiring to interface with the consumer premise device (e.g., if a DSL WAN interface is unavailable in the consumer premise device, the consumer premise device can alternately assign a 3G Wireless interface as WAN for Internet Access and Voice Over Internet Protocol (VOIP) Analog Telephone Adapter (ATA) access).

In yet another aspect, authentication can be employed to facilitate security setting for each consumer premise device in a secure manner. Default security classes for the consumer premise device can be assigned by service, for example. To facilitate proactive management and updates associated with the consumer premise device, the consumer premise device can provide desired information related to the consumer premise device to the remote management component at desired times, such as on a daily basis and/or after a configuration change or reboot with respect to the consumer premise device.

In another aspect, the remote management component can facilitate management of handoffs (e.g., mobility active session handoffs) of a mobile wireless communication device between a consumer premise device and another consumer premise device, or between a consumer premise device and a macro base station. The remote management component can use location information, Channel SNR, and Channel Capacity, respectively related to communications devices and respectively associated consumer premise devices in the wireless communication network to facilitate determinations regarding handoff a communication device between a consumer premise device and another consumer premise device or between a consumer premise device and a macro base station. For instance, the remote management component can utilize the host table and triangulation across multiple consumer premise devices and/or can receive information from base station Visitor Location Register (VLR) tables reporting presence of a communication device(s) to facilitate identifying the location of a communication device(s). The remote management component can determine whether to hand off a communication device based at least in part on the location, SNR, and Channel Capacity of the communication device.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
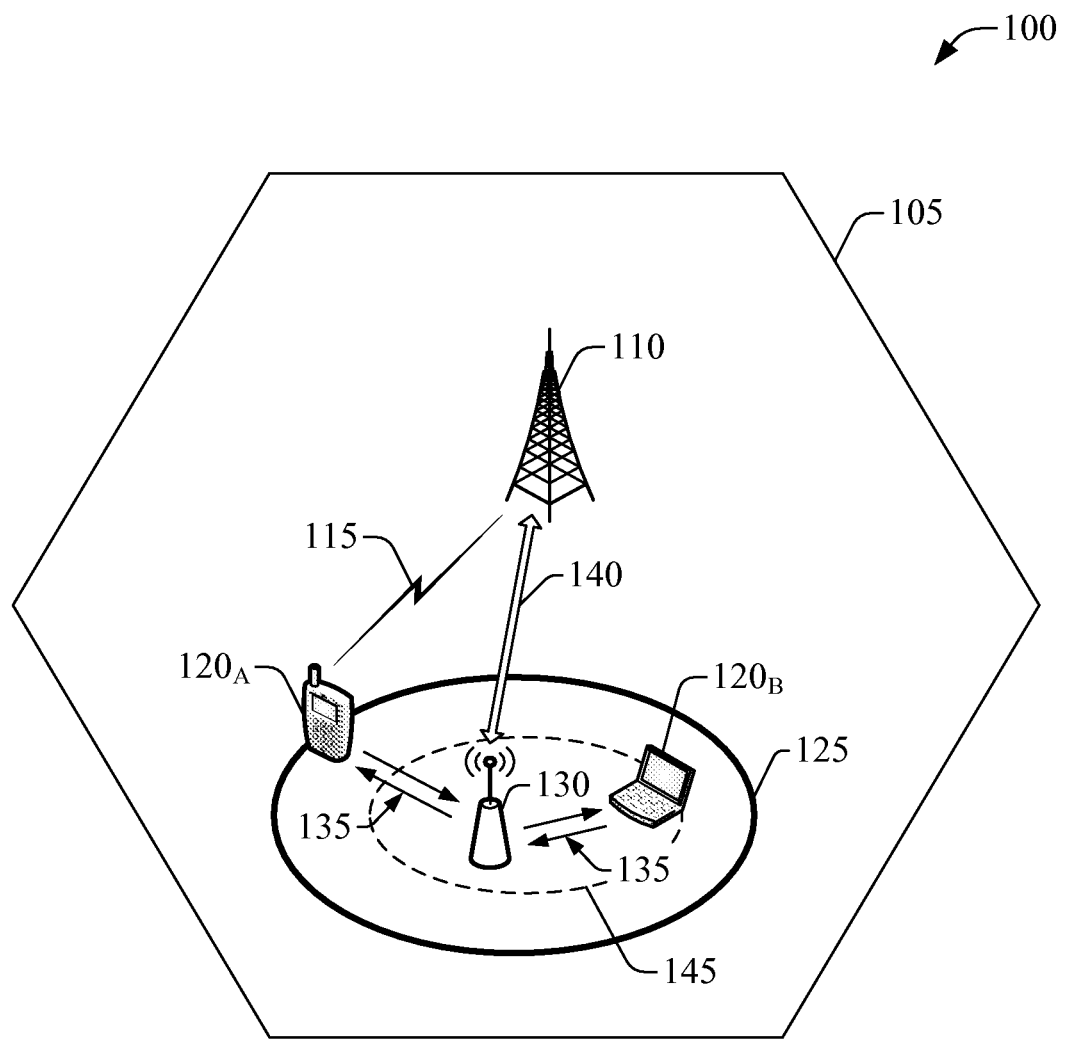
FIG. 1 illustrates a schematic wireless environment in which a consumer premise device comprising a femtocell can exploit various aspects described in the subject specification.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The subject innovation provides a lightweight framework that facilitates remote service and performance management that addresses desired areas related to installation, performance, crosstalk/interference mitigation, and security and policy management related to femtocells integrated in broadband gateways. The subject innovation comprises a remote service and spectrum profile that can facilitate femtocell management that is correlated to other service policies and WAN/LAN settings on the integrated femtocell-broadband gateways. The subject innovation defines desired remote data (e.g., performance data) to be collected from the integrated femtocell-broadband gateways. The subject innovation also defines a desired remote management protocol and techniques to facilitate optimizing performance, ensuring scaling, and supporting security and bandwidth policy.

As used in this application, the terms "component," "system," "platform," "service," "framework," "interface," "connector," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B." "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

In addition, the terms "wireless network" and "network" are used interchangeable in the subject application, when context wherein the term is utilized warrants distinction for clarity purposes such distinction is made explicit. Likewise, the terms "femtocell access point" and "femto access point" are also utilized interchangeably.

Referring to the drawings, FIG. 1 illustrates a schematic wireless environment (e.g., a network) 100 in which a consumer premise device comprising a femtocell can exploit various aspects described in the subject specification. In wireless environment 100, area 105 can represent a coverage macro cell which is served by base station 110. It should be appreciated that macro cell 105 is illustrated as a hexagon; however, macro cell(s) can adopt other geometries generally dictated by the deployment or floor plan, geographic areas to be covered, and so on. Macro coverage is generally intended for outdoors locations for servicing mobile wireless devices, such as UE $120_A$, and such coverage can be achieved via an over-the-air wireless link 115. The wireless link 115 can comprise a downlink (DL) and an uplink (UL), and can utilize a predetermined band of the radio frequency (RF) spectrum. In an aspect, UE 120 can be a Third Generation Partnership Project (3GPP) Universal Mobile Telecommunication System (UMTS) mobile phone.

Within macro coverage cell 105, a cell 145, served by a consumer premise device 130 (e.g., comprising an access point(s) (AP), such as a femtocell access point or femto access point), can be deployed, where the consumer premise device 130 can comprise a hybrid femtocell gateway that can integrate a femtocell into a broadband gateway (e.g., residential broadband gateway) supporting multiple WAN (e.g., DSL, 3G Wireless) and LAN (e.g., HPNA, Ethernet, 802.11g) interfaces. While in illustrative wireless environment 100 a single consumer premise device appears deployed within the macro cell, a substantive (e.g., $10^3$ to $10^6$) number of consumer premise devices 130 can be deployed, as desired. A consumer premise device 130 typically covers an area 125 that is determined, at least in part, by transmission power allocated to the consumer premise device 130, path loss, shadowing, and so forth. It should be appreciated that while coverage area 125 and confined area 145 typically coincide, in certain deployment scenarios, coverage area 125 can include an outdoor portion (e.g., a parking lot, a patio deck, a recreation area such as a swimming pool and nearby space) while area 145 can span an enclosed living space. Coverage area typically is spanned by a coverage radius that ranges from 20 to 100 meters. Confined coverage area 145 is generally associated with an indoor area, or a building, like a residential (e.g., a house, a condo, an apartment complex) or small business (e.g., a library, a hospital, a retail store) setting that can span a larger area (e.g., approximately 5000 sq. ft.). The consumer premise device 130 typically can service a desired number of wireless communication devices (e.g., subscriber station $120_B$) within confined coverage area 145. In an aspect, the consumer premise device 130 can integrate seamlessly with substantially any packet switched (PS)-based and circuit switched (CS)-based network; for instance, the consumer premise device 130 can integrate into an existing 3GPP Core Network via conventional interfaces like Iu-CS, Iu-PS, Gi, Gn. Thus, operation with a 3GPP wireless communication device or user equipment with a 3GPP subscriber identity module (SIM) card is substantially straightforward with the consumer premise device 130, and seamless when handoff to a macro cell associated with base station 110 from a cell 145 associated with the consumer premise device 130, handoff to a cell 145 associated with another consumer premise device 130 from a cell 145 associated with the consumer premise device 130, or handoff to a cell associated with the a consumer premise device 130 from a macro cell associated with base station 110, takes place. It is to be noted that substantially all voice or data active sessions associated with users within a coverage area (e.g., area 125) associated with the consumer premise device 130 are terminated once the consumer premise device 130 is shut down; in case of data sessions, data can be recovered at least in part through a buffer associated with a gateway at the network. Coverage of a suspended or hotlined subscriber station or associated account can be blocked over the air-interface. However, if a suspended or hotlined customer who owns a consumer premise device 130 is in Hotline/Suspend status, there is no substantive impact to the customers covered through consumer premise device 130. In another aspect, the consumer premise device 130 can exploit high-speed downlink packet access in order to accomplish substantive bitrates. In yet another aspect, consumer premise device 130 can have a location area code (LAC) and routing area code (RAC) that is different from the underlying macro network. These LAC and RAC can be used to identify subscriber station location for a variety of reasons, most notably to direct incoming voice and data traffic to appropriate paging transmitters.

As a subscriber station (e.g., UE $120_A$) that exploits macro coverage (e.g., cell 105) enters a coverage area (e.g., area 125) associated with a consumer premise device 130, the subscriber station (e.g., UE $120_A$) attempts to attach to the consumer premise device 130 through transmission and reception of attachment signaling. The signaling can be effected via a forward link/reverse link (FL/RL) 135; in an aspect of the subject innovation, the attachment signaling can include a Location Area Update (LAU) and/or Routing Area Update (RAU). Attachment attempts are a part of procedures to ensure mobility, so voice calls and data sessions can continue even after a transition from a macro cell associated with base station 110 to a cell 145 associated with a consumer premise device 130, a cell 145 associated with a consumer premise device 130 to a macro cell associated with base station 110, or a cell associated with a consumer premise device 130 to another cell 145 associated with another consumer premise device 130. It is to be noted that UE $120_A$ can be employed seamlessly after either of the foregoing transitions. In addition, femto-based networks typically are designed to serve stationary or slow-moving traffic with reduced signaling loads compared to macro networks. A femto service provider (e.g., an entity that commercializes, deploys, or utilizes a consumer premise device 130 comprising a femtocell) is therefore inclined to minimize unnecessary LAU/RAU signaling activity at substantially any opportunity to do so, and through substantially any available means. It is to be noted that substantially any mitigation of unnecessary attachment signaling/control is advantageous for operation of the consumer premise device 130. Conversely, if not successful, UE $120_A$ generally can be commanded (through a variety of communication means) to select another LAC/RAC or enter "emergency calls only" mode. It is to be appreciated that this attempt and handling process can occupy significant UE battery, and capacity of the consumer premise device and signaling resources (e.g., communication of pilot sequences) as well.

When an attachment attempt is successful, UE $120_A$ can be allowed on cell 125 associated with the consumer premise device 130, and incoming voice and data traffic can be paged and routed to the subscriber through the consumer premise device 130. To facilitate voice and data routing, and control signaling as well, successful attachment can be recorded in a memory register, e.g., a Visitor Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable, . . . ). To this end, a consumer premise device 130 typically can be connected to the broadband backhaul network backbone 140 (e.g., backhaul pipe) via a broadband modem (not shown). Through backhaul pipe 140, the consumer premise device 130 can handle substantially any quality of service (QoS) for heterogeneous packetized traffic (e.g., various, multiple packet flows). In an aspect of the subject innovation, a consumer premise device 130 can display status indicators for power, active broadband/DSL connection, and gateway connection. In another aspect, no landline is necessary for operation of the consumer premise device 130.

Figure 2:
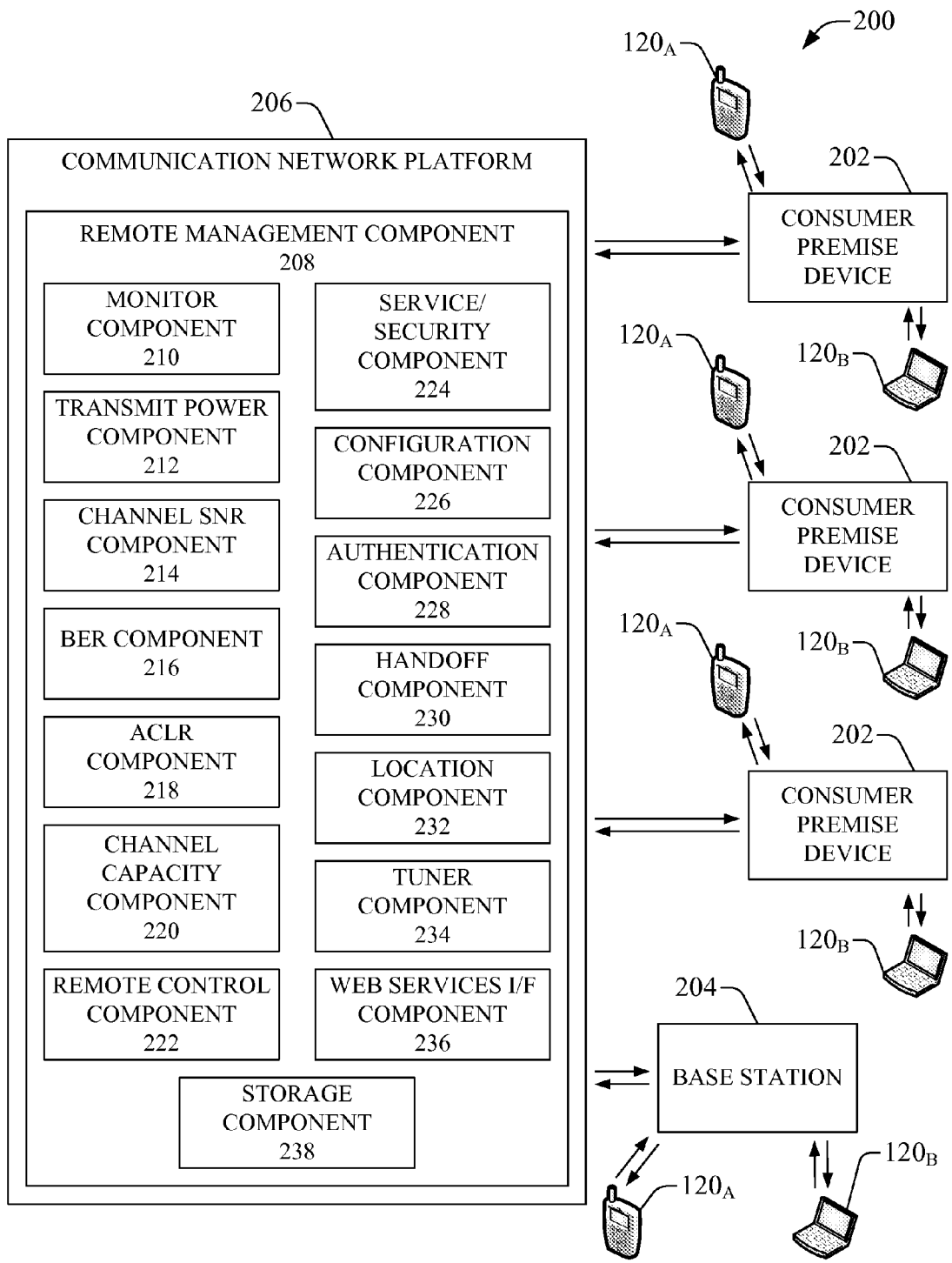
FIG. 2 illustrates a block diagram of an example system that can facilitate remote management of consumer premise devices in a wireless communication environment in accordance with an aspect of the disclosed subject matter.

FIG. 2 illustrates a block diagram of an example system 200 that can facilitate remote management of consumer premise devices (e.g., hybrid femtocell gateways) in a wireless communication environment in accordance with an aspect of the disclosed subject matter. In one aspect, the example system 200 can include a plurality of consumer premise devices 202 that each can comprise a hybrid femtocell gateway that can integrate a femtocell into a broadband gateway (e.g., residential broadband gateway) supporting multiple Wide Area Network (WAN) (e.g., DSL, 3G Wireless) and Local Area Network (LAN) (e.g., HPNA, Ethernet, 802.11g) interfaces. The consumer premise devices 202 can wirelessly connect with communication devices, such as UE $120_A$ or other subscriber station $120_B$ (e.g., computer), within the respective coverage areas of the consumer premise devices 202. System 200 also can comprise one or more base stations 204 that can wirelessly connect with communication devices within the base station coverage area to facilitate communication by communication devices in the wireless communication environment. It is to be appreciated and understood that the consumer premise devices 202, subscriber stations (e.g., $120_A$ or other subscriber station $120_B$), base stations 204, and other components, each can be the same or similar as, or can comprise the same or similar functionality as, respective components as more fully described herein, for example, with regard to system 100. It is to be further appreciated and understood that, while exemplary numbers of consumer premise devices 202 and base stations 204 are illustrated in FIG. 2, the subject innovation is not so limited, as the subject innovation can employ less than, the same number as, or more than the respective number of consumer premise devices 202 and base stations 204 illustrated in FIG. 2.

In accordance with an aspect, the system 200 can comprise a communication network platform 206 that can be associated with the consumer premise devices 202 and base stations 204 in the wireless communication environment. The communication network platform 206 can serve or facilitate communication with communication devices, such as UE $120_A$, via a macro radio access network (RAN). It should be appreciated that in cellular wireless technologies (e.g., 3GPP UMTS, HSPA, 3GPP LTE, 3GPP UMB), at least a portion of the communication network platform 206 can be embodied in a Core Network. The communication network platform 206 also can serve or facilitate communication with communication devices, such as UE $120_A$, through a femto RAN that can be linked to the communication network platform 206 via a backhaul pipe(s) (e.g., backhaul pipe 140).

In another aspect, the communication network platform 206 can contain a remote management component 208 that can facilitate lightweight and dynamic remote management of the consumer premise devices 202. The remote management component 208 can employ profile assignment, remote performance data collection related to performance of consumer premise devices and respectively associated communication devices, and dynamic control settings to facilitate remote management of the consumer premise devices 202. In an aspect, the remote management component 208 can comprise a monitor component 210 that can monitor various parameters, such as Transmit Power, Channel Signal-to-Noise Ratio (SNR), Channel Bit Error Rate (BER), and Adjacent Channel Leakage ratio (ACLR), associated with a consumer premise device(s) 202 and/or respectively associated communication devices.

The remote management component 208 can include a transmit power component 212 that can measure the transmit power associated with a consumer premise device 202 and can contain information related to desired transmit power to facilitate control of the transmit power associated with the consumer premise devices 202. The transmit power component 212 can evaluate interference in a consumer premise device 202 from a neighboring consumer premise device(s) 202 to facilitate determining whether the transmit power of a neighboring consumer premise device(s) 202 is to be adjusted (e.g., reduced). The remote management component 208 also can include a channel SNR component 214 that that can measure the channel SNR associated with a communication device(s) associated with a consumer premise device 202 and can comprise information related to desired channel SNR to facilitate control of channel SNR associated with the communication device(s). The channel SNR component 214 can evaluate and verify whether the channel SNR associated with a communication device(s) is meeting predetermined system specifications for channel SNR. The channel SNR component 214 also can detect and/or receive notification when the channel SNR associated with a communication device(s) is below a predetermined threshold SNR level.

The remote management component 208 can further include a BER component 216 that that can measure the BER associated with a communication device(s) associated with a consumer premise device 202 and can contain information related to a desired BER to facilitate control of the BER of a communication device(s). The BER component 216 can evaluate and verify whether the BER associated with a communication device(s) is meeting predetermined system specifications for BER. The BER component 216 also can detect and/or receive notification when the BER associated with a consumer premise device 202 exceeds a predetermined threshold BER level. The remote management component 208 also can contain an ACLR component 218 that that can measure the ACLR associated with a consumer premise device 202 and can include information related to a desired ACLR to facilitate control of the ACLR associated with consumer premise devices 202. The ACLR component 218 can evaluate and verify whether the ACLR associated with a consumer premise device 202 is meeting predetermined system specifications for ACLR. The ACLR component 218 also can detect and/or receive notification when the ACLR associated with a consumer premise device 202 exceeds a predetermined threshold ACLR level. The various parameters, such as Transmit Power, Channel SNR, BER, and ACLR, can be exposed to the remote management component 208 via web services.

In yet another aspect, the remote management component 208 can employ a channel capacity component 220 that can poll and calculate channel capacity of a consumer premise device 202 based at least in part on measured SNR of a communication device(s) associated with a consumer premise device 202. The remote management component 208 can utilize channel capacity and channel SNR information to facilitate determinations regarding whether to handoff a communication device from a current cell to a macro cell associated with a base station 204 or another cell associated with another consumer premise device 202.

In still another aspect, the remote management component 208 can include a remote control component 222 that can employ one or more remote controls that can facilitate dynamically adjusting certain parameters, such as Transmit Power, Blocking Settings, and/or Adjacent Channel Selectivity, associated with the consumer premise device(s) 202, and/or a transmit power output management control that can facilitate controlling the transmit power (e.g., maximum transmit power) of consumer premise devices 202 in the wireless communication network. For example, the transmit power component 212 can detect whether a particular consumer premise device 202 is experiencing interference from a neighbor consumer premise device(s) 202. If interference is detected from a neighbor consumer premise device(s) 202, the remote control component 222 can employ the output power management control to facilitate controlling output power (e.g., maximum output power) of consumer premise devices 202 to reduce or minimize interference between neighboring consumer premise devices 202.

In still another aspect, the remote management component 208 can facilitate remote management of Quality of Service (QoS) and Security. The remote management component 208 can employ service/security component 224 that can maintain a QoS profile for each consumer premise device 202. A QoS profile can comprise various information, including a radio frequency (RF) spectral setting (e.g., static RF spectral setting), service QoS policy, and/or security policy, associated with the consumer premise device(s) 202. The QoS profile can comprise a host table, which can store one or more of aggregate service bandwidth requirements, agreed QoS such as minimum bit rate, and/or required QoS, and can list each locally connected communication device (e.g., $120_A$, $120_B$), respectively associated with a consumer premise device 202 or macro base station 204, by service with associated policy and security assignment, as well as location information related to neighboring consumer premise devices 202 and macro base stations 204. The service/security component 224 also can employ another table, contained in the respective QoS profiles, that can contain all available interfaces (e.g., LAN, WAN) for respective consumer premise devices 202. The QoS profile can include information relating to allocation of bandwidth for various services associated with the consumer profile device 202 and/or an associated communication device(s) as well as information related to routing in a femtocell, RF interface, and/or IP interface, associated with a consumer premise device 202. Also, the QoS profile can comprise information related to access control lists that are desired to be administered (e.g., verify by MAC address, verify by source IP address, . . . ). Information in the QoS profile can be further utilized to facilitate generating and implementing rules, such as firewall rules associated with communication devices.

In an aspect, the QoS profiles can be stored in a geo-coded location registry database, in the remote management component 208, that can include respective geographical location information of femtocells in consumer premise devices 202 and base stations 202 to facilitate making determinations related to handoff of a communication device from one cell (e.g., femtocell, cell associated with a base station) to another cell and for interference detection between neighboring cells to facilitate reducing interference between such cells.

In another aspect, the information in QoS profiles can be used for a variety of other desired applications. For example, the information in the QoS profiles can be used to facilitate triangulating to determine a location of a person associated with a communication device, or can be used to coordinate other applications on communication devices (e.g., iPhone can use information associated with QoS profile to facilitate WiFi communications).

In an aspect, the respective QoS profiles can be remotely administered by the service/security component 224. In another aspect, assignment of communication devices (e.g., $124_A$, $124_B$) to interface with a consumer premise device 202 can be administered by the consumer premise device 202 and the end user associated with the consumer premise device 202. Each consumer premise device 202 can have default selections related to assignment of communication devices for interface with the consumer premise device 202. The service/security component 224 can operate in conjunction with a configuration component 226, where the assignment of service bandwidth and Class of Service (CoS) policy for a consumer premise device 202 can be automatically configured by the configuration component 226 based at least in part on the remotely administered QoS profile associated with the consumer premise device 202.

For example, when certain communication devices, such as an iPhone, 3G cellular phone, and a personal computer are interfacing with a consumer premise device 202, the iPhone can be assigned to a WiFi LAN interface, the 3G cellular phone can be assigned to a femto 3G Wireless interface, and the personal computer (PC) can be assigned to an Ethernet LAN interface, as desired. To facilitate improved reliability, in the event that a particular interface is not available in a consumer premise device 202, the consumer premise device 202 can select an alternate assignment option for a communication device desiring to interface with the consumer premise device 202. As an example, in the consumer premise device 202, if a DSL WAN interface is unavailable, the consumer premise device 202 can alternately assign a 3G Wireless interface as WAN for Internet Access and Voice Over Internet Protocol (VOIP) Analog Telephone Adapter (ATA) access to facilitate interfacing a communication device with the consumer premise device 202.

In yet another aspect, the remote management component 208 can include an authentication component 228 that can authenticate consumer premise devices 202 associated with the communication network platform 206, where authentication can be employed to facilitate security setting for each consumer premise device 202 in a secure manner. Default security classes for each consumer premise device 202 can be assigned by service, for example.

In still another aspect, to facilitate proactive management and updates associated with a consumer premise device 202, the consumer premise device 202 can provide desired information related to the consumer premise device 202 to the remote management component 208 at desired times, such as on a daily basis and/or after a configuration change or reboot with respect to the consumer premise device 202.

In another aspect, the remote management component 208 can comprise a handoff component 230 that can facilitate management of handoffs (e.g., mobility active session handoffs) of a communication device between a cell associated with a consumer premise device 202 and a cell associated with another consumer premise device 202, or between a cell associated with a consumer premise device 202 and a macro base station 204. The handoff component 230 can receive and/or use location information, channel SNR of a communication device, and Channel Capacity, respectively related to communications devices and respectively associated consumer premise devices 202 in the wireless communication network to facilitate determinations regarding whether to handoff a communication device from a cell associated with a consumer premise device 202 to a cell associated with another consumer premise device 202, from a cell associated with a consumer premise device 202 to a cell associated with a macro base station 204, or from a cell associated with a macro base station 204 to a cell associated with a consumer premise device 202. In an aspect, a location component 232 can utilize information in the host table and triangulation across multiple consumer premise devices 202 and/or can receive information from base station VLR tables reporting presence of a communication device(s) to facilitate identifying the location of a communication device(s). The handoff component 230 can determine whether to hand off a communication device based at least in part on the location of the communication device, Channel SNR of the communication device, and Channel Capacity of the consumer premise device 202, and predetermined handoff criteria.

In an aspect, the remote management component 208 can contain a tuner component 234 that can facilitate controlling or tuning parameters related to transmit power, Channel SNR, Channel BER, ACLR, and/or other parameters of a consumer premise device 202 to facilitate improving service (e.g., improving SNR, reducing interference) related to the consumer premise device 202 and communication devices connected to the consumer premise device 202. For example, the tuner component 234 can collect and evaluate performance data associated with a consumer premise device 202 and neighboring consumer premise devices 202 in the network. When evaluating the collected performance data, if the tuner component 234 determines that a parameter(s) associated with the consumer premise device 202 is at an undesirable level, the tuner component 234 can facilitate determining a desirable parameter level(s) for the parameter(s) and the remote management component 208 can transmit the parameter information to the consumer premise device 202 to facilitate adjusting the parameter(s) in the consumer premise device 202 to the desired parameter level(s) to facilitate improving service in the consumer premise device 202 and communication devices connected thereto.

In another aspect, the remote management component 208 can comprise a web services interface component 236 that can facilitate enabling the remote management component 208 to access the remote gateway associated with a consumer premise device(s) 202 to facilitate collection of performance data (e.g., parameter levels) associated with the consumer premise device(s) 202 and/or a communication device(s) associated therewith.

In yet another aspect, the remote management component 208 can include a storage component 238 that can store information related to the communication network platform 206, consumer premise devices 202, base stations 204, and/or the wireless communication network. For instance, the information stored in the storage component 238 can include information related to parameters (e.g., transmit power, Channel SNR, Channel BER, ACLR, ... ), Channel Capacity, QoS (e.g., QoS profiles of respective consumer premise devices 202), security, authentication, CoS, predetermined handoff criteria, assignment of service bandwidth, interfaces, etc.

The storage component 238 can comprise nonvolatile and/or volatile memory. The nonvolatile memory can include, but is not limited to, flash memory (e.g., single-bit flash memory, multi-bit flash memory), read-only memory (ROM), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)). Volatile memory can include, but is not limited to, random access memory (RAM), static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

The framework of the subject innovation can co-exist and can complement existing frameworks, for example, by employing web service interfaces. The subject innovation can use low overhead and limiting control messages to a specified number of desired (e.g., essential) parameters can ensure that the remote management by the remote management component 208 is efficient and scalable.

In accordance with one embodiment of the subject innovation, the remote management component 208 can utilize artificial intelligence (AI) methods to infer (e.g., reason and draw a conclusion based at least in part on a set of metrics, arguments, or known outcomes in controlled scenarios) whether to handover a communication device to a particular consumer premise device 202 or base station 204; whether transmit power associated with a consumer premise device(s) 202 is to be adjusted, for example, to reduce interference; a location of a communication device in the wireless communication network; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 200 to facilitate rendering an inference(s) related to the system 200.

In particular, the remote management component 208 can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 200 to facilitate making inferences or determinations related to system 200.

Figure 3:
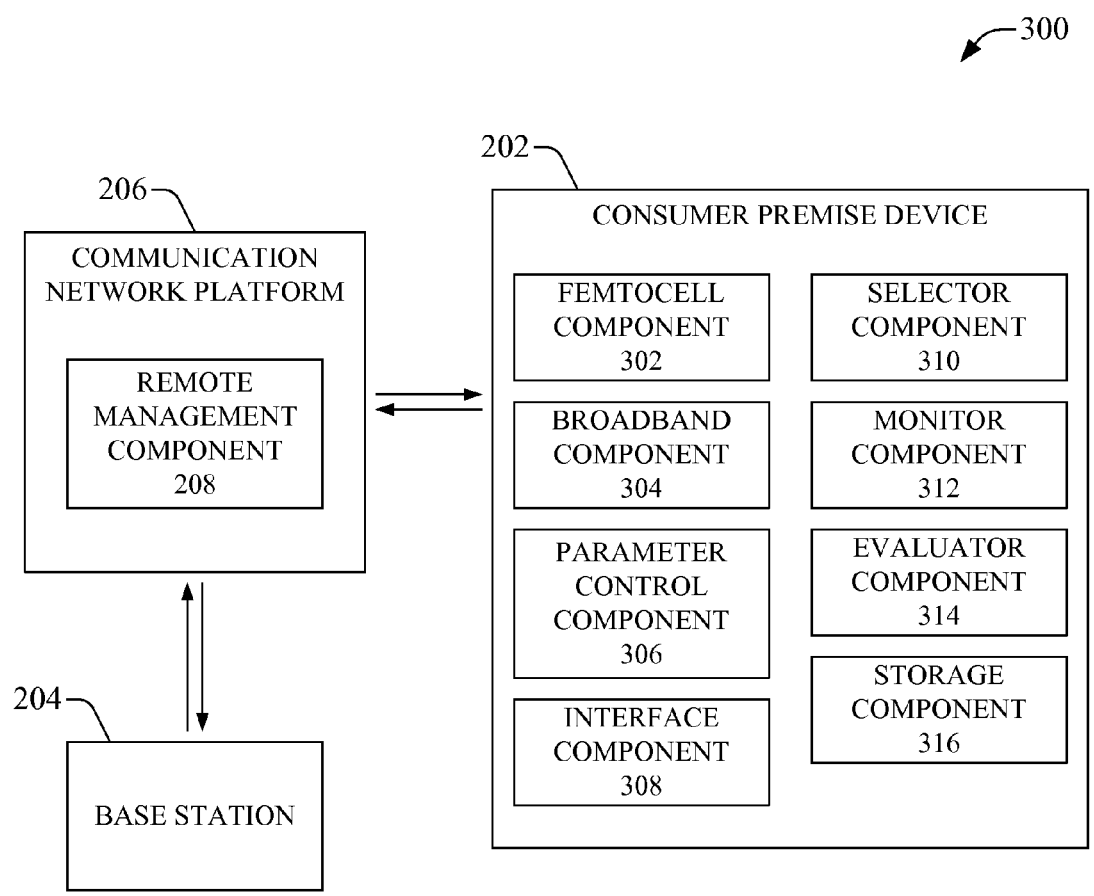
FIG. 3 illustrates a block diagram of another example system that can facilitate remote management of consumer premise devices in a wireless communication environment in accordance with an aspect of the disclosed subject matter.

FIG. 3 illustrates a block diagram of another example system 300 that can facilitate remote management of consumer premise devices in a wireless communication environment in accordance with an aspect of the disclosed subject matter. In one aspect, the example system 300 can include a plurality of consumer premise devices 202 (e.g., only one consumer premise device 202 is shown for clarity) that each can comprise a hybrid femtocell gateway that can integrate a femtocell into a broadband gateway supporting multiple WAN (e.g., DSL, 3G Wireless) and LAN (e.g., HPNA, Ethernet, 802.11g) interfaces. The consumer premise devices 202 can wirelessly connect with communication devices, such as subscriber station $120_A$ (e.g., cellular phone) or subscriber station $120_B$ (e.g., computer), within the respective coverage areas of the consumer premise devices 202. System 300 also can comprise one or more base stations 204 that can wirelessly connect with communication devices within the base station coverage area to facilitate communication by communication devices in the wireless communication environment. System 300 can further include a communication network platform 206 that can be associated with the consumer premise devices 202 and base stations 204 in the wireless communication environment. The communication network platform 206 can serve or facilitate communication with communication devices connected to respective consumer premise devices 202 or base stations 204. The communication network platform 206 can include a remote management component 208 that can facilitate lightweight and dynamic remote management of the consumer premise devices 202. It is to be appreciated and understood that the consumer premise devices 202, subscriber stations (e.g., $120_A$ or other subscriber station $120_B$), base stations 204, communication network platform 206, remote management component 208, and other components, each can be the same or similar as, or can comprise the same or similar functionality as, respective components as more fully described herein, for example, with regard to system 100 and system 200.

In one aspect, the consumer premise device 202 can include a femtocell component 302 that can employ a femtocell to facilitate communication by communication devices in the wireless communication environment. The consumer premise device 202 also can comprise a broadband component 304 that can employ one or more desired broadband technologies to facilitate communication by communication devices in the wireless communication environment. For instance, the broad band component 304 can employ WiFi, WiMax, DSL, Cable, 3G Wireless, HPNA, Ethernet, 802.11g, etc. to facilitate communication with communication devices.

In another aspect, the consumer premise device 202 can include a parameter control component 306 that can facilitate controlling (e.g., setting, adjusting) parameters in the consumer premise device 202 related to transmit power, Channel SNR, BER, and ACLR, and/or other parameters to facilitate optimizing service associated with a consumer premise device 202 and communication devices connected thereto. The parameter control component 306 also can receive parameter information from the communication network platform 206 to facilitate assignment and configuration (e.g., automatic configuration) of service bandwidth and CoS policy based at least in part on a QoS profile associated with the consumer premise device 202, where the QoS profile can be remotely stored and administered by the remote management component 208.

The consumer premise device 202 also can include an interface component 308 that can employ desired interfaces to facilitate connecting communication devices to the consumer premise component 202. For instance, the interface component 308 can employ interfaces (e.g., wired and/or wireless interfaces), such as an ethernet interface(s), a WiFi interface(s), a WiMax interface(s), a DSL interface(s), a cable modem interface(s), a USB interface(s) (e.g., USB port(s)), a Firewire interface(s) (e.g., Firewire port(s)), and/or other interfaces.

The consumer premise device 202 also can contain a selector component 310 that can facilitate selecting or assigning an interface of the consumer premise device 202 to which a communication device is to be connected. The selector component 310 can facilitate selecting an interface based at least in part on type of communication device, type of interface(s), interface availability, and/or other criteria. The end user of the consumer premise device 202 can administer assignment of communication devices to interfaces of the consumer premise device 202, and appropriate default options for assignment of an interface can be provided by the consumer premise device 202 and/or the communication network platform 206.

In another aspect, the consumer premise device 202 can include a monitor component 312 that can monitor functions and monitor and/or measure parameters associated with the consumer premise device 202 and communication devices connected thereto. For example, the monitor component 312 can facilitate measuring parameters, such as respective signal strengths of communication devices connected to the consumer premise device 202, where the parameter measurements can be communicated to the communication network platform 206 to facilitate enabling the communication network platform 206 to render decisions or determinations regarding remote management of the consumer premise devices 202 and communication devices associated therewith in the wireless communication network.

In yet another aspect, the consumer premise device 202 can comprise an evaluator component 314 that can evaluate data, such as parameter measurements, information received from the communication network platform 206, information received from communication devices, and/or other data, to facilitate making determinations relating to setting or configuring parameters or functions of the consumer premise device 202.

In still another aspect, the consumer premise device 202 can include a storage component 316 that can store information related to communication devices, the consumer premise device 202, and/or other information associated with the wireless communication network. For instance, the information stored in the storage component 316 can include information related to parameters (e.g., transmit power, Channel SNR, Channel BER, ACLR, . . . ), controlling parameters, QoS (e.g., QoS profile of the consumer premise device 202), security, authentication, CoS, service bandwidth, interfaces, etc.

The storage component 316 can comprise nonvolatile and/or volatile memory. The nonvolatile memory can include, but is not limited to, flash memory (e.g., single-bit flash memory, multi-bit flash memory), ROM, mask-programmed ROM, PROM, EPROM, UV-erase EPROM, one-time programmable ROM, EEPROM, and/or nonvolatile RAM (e.g., FeRAM). Volatile memory can include, but is not limited to, RAM, SRAM, DRAM, SDRAM, DDR SDRAM, ESDRAM, SLDRAM, RDRAM, DRDRAM, and RDRAM.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems described above, example methodologies that can be implemented in accordance with the disclosed subject matter can be better appreciated with reference to flowcharts in FIGS. 4-9. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 4:
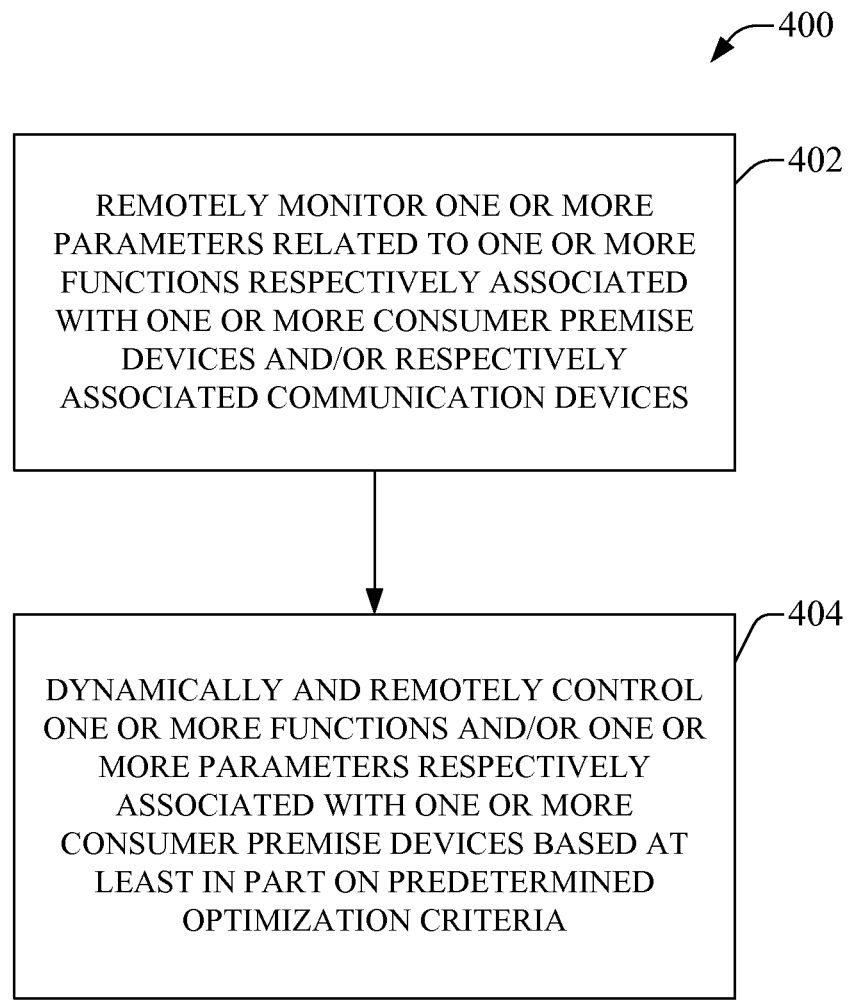
FIG. 4 depicts a flowchart of an example methodology that can facilitate remotely managing consumer premise devices in a wireless communication environment in accordance with an aspect of the disclosed subject matter.

FIG. 4 depicts a flowchart of an example methodology 400 that can facilitate remotely managing consumer premise devices (e.g., hybrid femtocell gateways) in a wireless communication environment in accordance with an aspect of the disclosed subject matter. At 402, one or more parameters related to one or more functions respectively associated with one or more consumer premise devices (e.g., 202) and/or respectively associated communication devices can be remotely monitored. In an aspect, one or more parameters, such as, for example, Transmit Power, Channel SNR, Channel BER, and/or ACLR, respectively associated with one or more consumer premise devices and respectively associated communication devices can be exposed via web services and remotely monitored and measured to facilitate remote management of the consumer premise devices and respectively associated communication devices. In another aspect, the consumer premise device can be or can comprise a hybrid femtocell gateway that can integrate a femtocell into a broadband gateway supporting multiple WAN and LAN interfaces. In yet another aspect, a communication network platform 206 can comprise a remote management component 208 that can facilitate remotely monitoring and measuring the parameters associated with the consumer premise devices and/or respectively associated communication devices in the wireless communication network (e.g., the remote management component 208 can remotely initiate a measurement, can remotely measure, and/or can remotely receive information related to measurement of one or more parameters related to one or more functions respectively associated with one or more consumer premise devices and/or respectively associated communication devices).

At 404, one or more functions and/or one or more parameters respectively associated with one or more consumer premise devices can be dynamically and remotely controlled based at least in part on predetermined optimization criteria. In an aspect, one or more functions, such as handover of a communication device from one cell (e.g., cell associated with a consumer premise device, cell associated with a macro base station) to another cell (e.g., cell associated with a consumer premise device, cell associated with a macro base station), and/or one or more parameters (e.g., Transmit Power, Channel SNR, Channel BER, ACLR) of a consumer premise device(s) can be dynamically and remotely controlled based at least in part on predetermined optimization criteria. The predetermined optimization criteria can relate to, for example, desired (e.g., optimal) parameter levels respectively associated with consumer premise devices and/or associated communication devices, threshold levels (e.g., maximum level, minimum level) for respective parameters respectively associated with consumer premise devices and/ or associated communication devices, interference between neighboring consumer premise devices, handoff of communication device to another cell (e.g., based at least in part on SNR of a communication device and Channel Capacity associated with the consumer premise device), etc.

In an aspect, the remote management component 208 can remotely measure desired parameters associated with consumer premise devices and respectively associated communication devices. The remote management component 208 can remotely control (e.g., adjust) a parameter(s) to facilitate desired performance in consumer premise devices based at least in part on predetermined optimization criteria. For example, the remote management component 208 can remotely measure the Channel BER of a communication device(s) associated with the consumer premise device 202 and can determine that the Channel BER exceeds a predetermined maximum threshold BER level. The remote management component 208 can facilitate remotely adjusting a parameter(s) associated with the consumer premise device and/or associated communication device to facilitate reducing the Channel BER to a desired level that is less than the predetermined maximum threshold level. At this point methodology 400 can end.

Figure 5:
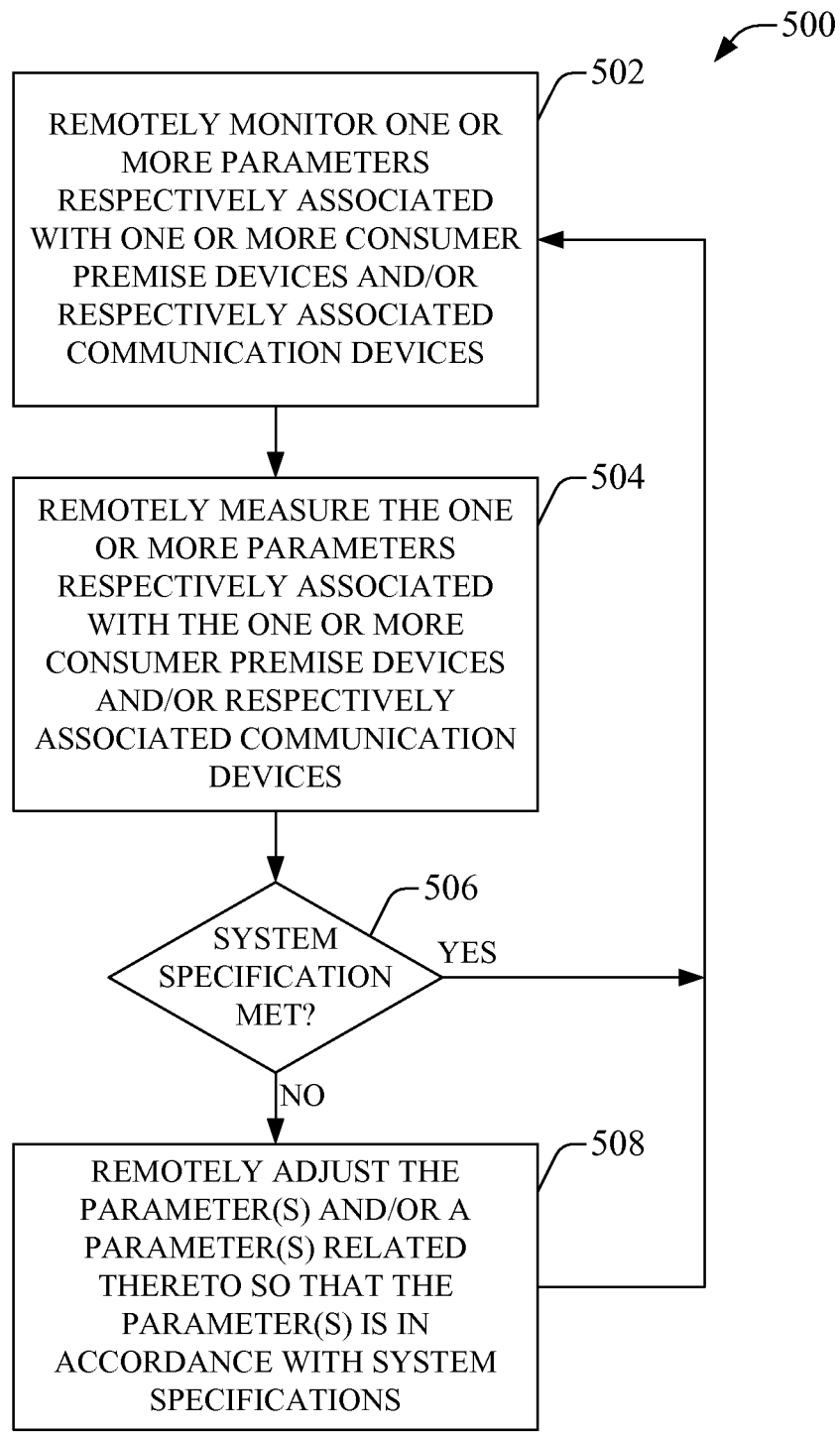
FIG. 5 illustrates a flowchart of another example methodology that can facilitate remotely managing consumer premise devices in a wireless communication environment in accordance with an aspect of the disclosed subject matter.

FIG. 5 illustrates a flowchart of another example methodology 500 that can facilitate remotely managing consumer premise devices in a wireless communication environment in accordance with an aspect of the disclosed subject matter. At 502, one or more parameters respectively associated with one or more consumer premise devices (e.g., 202) and/or respectively associated communication devices can be remotely monitored. In an aspect, one or more parameters, including, for example, Transmit Power, Channel SNR, Channel BER, ACLR, respectively associated with consumer premise devices (e.g., comprising hybrid femtocell gateways) and/or respectively associated communication devices in a wireless communication network can be monitored remotely, for example, by a remote management component 208 in the communication network platform 206. At 504, the one or more parameters respectively associated with the one or more consumer premise devices and/or respectively associated communication devices can be remotely measured. In one aspect, the remote management component 208 can remotely measure and/or receive information regarding measurement of the one or more parameters respectively associated with the consumer premise devices and/or respectively associated communication devices to facilitate remotely controlling parameters in the consumer premise devices and/or respectively associated communication devices.

At 506, a determination can be made regarding whether system specifications are met based at least in part on the measured parameter(s). For instance, the measured parameter levels from a consumer premise device(s) and/or respectively associated communication devices can be evaluated to determine whether the parameter levels are in accordance with system specifications (e.g., communication system specifications) based at least in part on predetermined optimization criteria. For example, the Channel SNR of a communication device associated with a consumer premise device can be measured by the remote management component 208. The remote management component 208 can determine whether the Channel SNR is within threshold SNR levels (e.g., higher than a predefined minimum threshold SNR level) based at least in part on the predetermined optimization criteria.

If, at 506, it is determined that a parameter(s) does not meet the system specifications, at 508, the parameter(s) and/or a parameter(s) related thereto can be adjusted remotely so that the parameter(s) is in accordance with system specifications. In one aspect, if the remote management component 208 determines that a parameter(s) does not meet the system specifications (e.g., Channel SNR has exceeded a predefined threshold SNR level), the remote management component 208 can facilitate autonomously generating a notification that a parameter(s) is not in accordance with system specifications (e.g., a notification that a parameter(s) related to SNR or BER has crossed an applicable threshold level to an undesirable or unacceptable level). The remote management component 208 can facilitate adjusting the parameter(s) in the consumer premise device 202 or communication device associated therewith remotely so that the parameter(s) is in accordance with system specifications (e.g., can adjust a parameter(s) related to the Channel SNR so that the SNR level is above the predefined minimum threshold SNR level).

If, at 506, it is determined that the parameter(s) meets the system specifications, methodology 500 can return to reference numeral 502, where one or more parameters respectively associated with the one or more consumer premise devices and/or respectively associated communication devices can be monitored remotely. Methodology 500 can proceed from that point. At this point methodology 500 can end.

Figure 6:
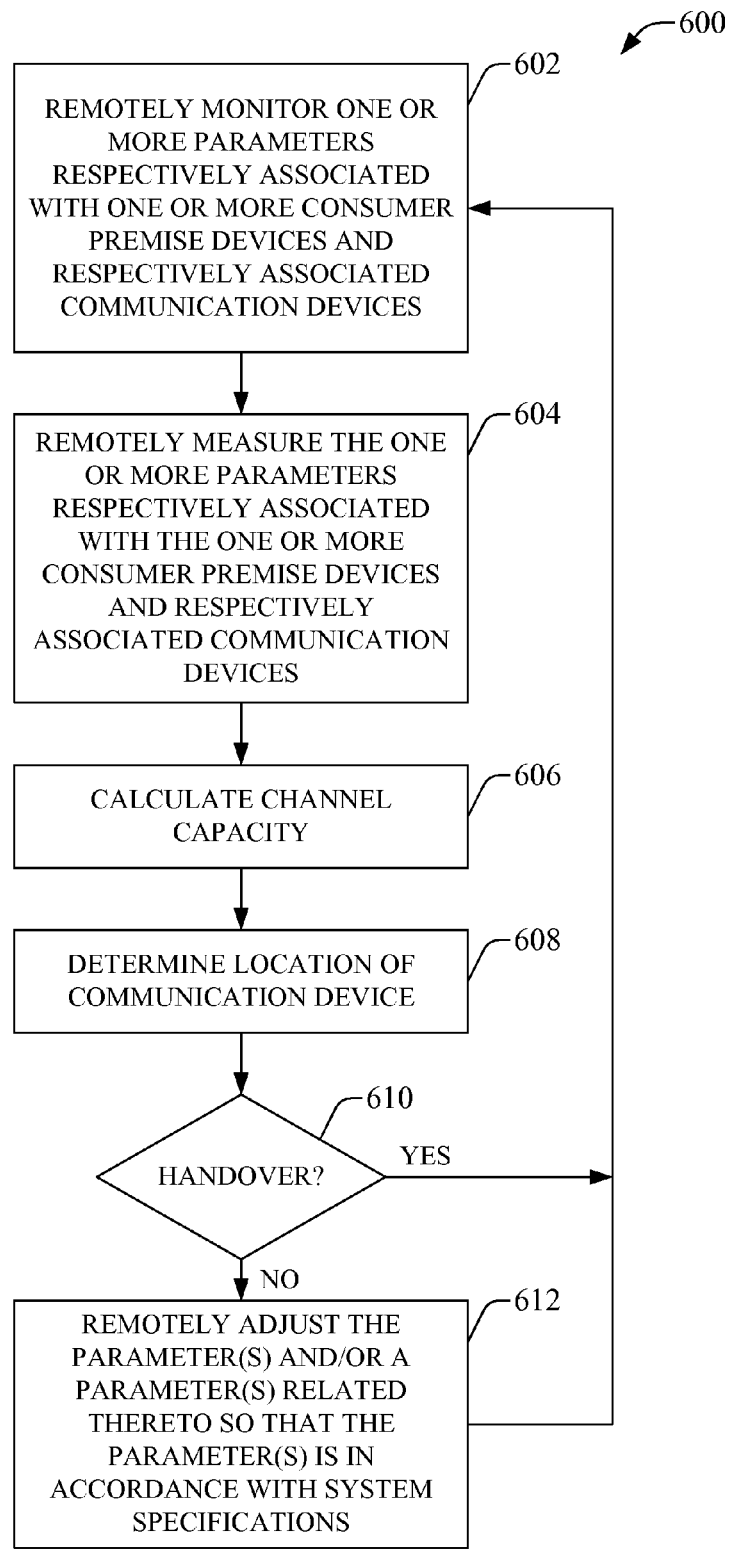
FIG. 6 depicts a flowchart of an example methodology that can facilitate remote handoff of a communication device associated with a consumer premise device in a wireless communication environment in accordance with an aspect of the disclosed subject matter.

FIG. 6 depicts a flowchart of an example methodology 600 that can facilitate remote handoff of a communication device associated with a consumer premise device in a wireless communication environment in accordance with an aspect of the disclosed subject matter. At 602, one or more parameters respectively associated with one or more consumer premise devices (e.g., 202) and respectively associated communication devices can be remotely monitored. In an aspect, the one or more parameters, including, for example, Channel SNR of communication devices respectively associated with consumer premise devices 202 (e.g., comprising hybrid femtocell gateways) in a wireless communication network, can be monitored remotely, for example, by a remote management component 208 in the communication network platform 206.

At 604, the one or more parameters respectively associated with the one or more consumer premise devices and respectively associated communication devices can be remotely measured. In one aspect, the remote management component 208 can remotely measure and/or receive information regarding measurement of the one or more parameters (e.g., parameter(s) related to Channel SNR) respectively associated with communication devices and/or respectively associated with consumer premise devices to facilitate determining whether a communication device is to be handed off from one cell to another cell. At 606, Channel Capacity of a consumer premise device can be calculated (or Channel Capacity of a macro base station can be calculated or received). In an aspect, the remote management component 208 can calculate the Channel Capacity of a consumer premise device 202 associated with the communication device. The Channel Capacity can be calculated utilizing any suitable technique or algorithm, including techniques or algorithms as known in the art.

At 608, a location of a communication device can be determined. In one aspect, the location of a communication device can be determined in part, for example, using a host table associated with a QoS profile related to a consumer premise device 202, where the host table can be stored in the remote management component 208 and can include information related to the consumer premise device 202 and/or the communication device; employing triangulation across multiple consumer premise devices in the wireless communication network; and/or using base station VLR tables related to base stations 204 in the wireless communication network, where the VLR tables can include information reporting the presence of a communication device and can facilitate identifying a location of the communication device.

At 610, a determination can be made regarding whether the communication device is to be handed over from a current cell to another cell. For instance, the remote management component 208 can evaluate the measured channel SNR, calculated channel capacity, location information (e.g., location of the communication device and respective cells), and/or other information to facilitate determining whether a communication device is to be handed off from a current cell, associated with a consumer premise device 202 or macro base station 204, to another cell, associated with a disparate consumer premise device 202 or macro base station 204, based at least in part on the measured Channel SNR of the communication device, calculated Channel Capacity of the consumer premise device (or macro base station), location of the communication device, and predetermined handoff criteria.

If at 610, it is determined that the communication device is to be handed off from a current cell to another cell, at 612, the communication device can be handed off to the other cell. For instance, the communication device can be handed over from a current cell, associated with a consumer premise device 202 or macro base station 204, to another cell, associated with a disparate consumer premise device 202 or macro base station 204.

Referring again to reference numeral 610, if, at 610, it is determined that the communication device is not be handed off from a current cell to another cell, methodology 600 can return to reference numeral 602, and methodology 600 can proceed to remotely monitor the one or more parameters respectively associated with one or more consumer premise devices (e.g., 202) and respectively associated communication devices. Methodology 600 can continue to proceed from that point. At this point methodology 600 can end.

Figure 7:
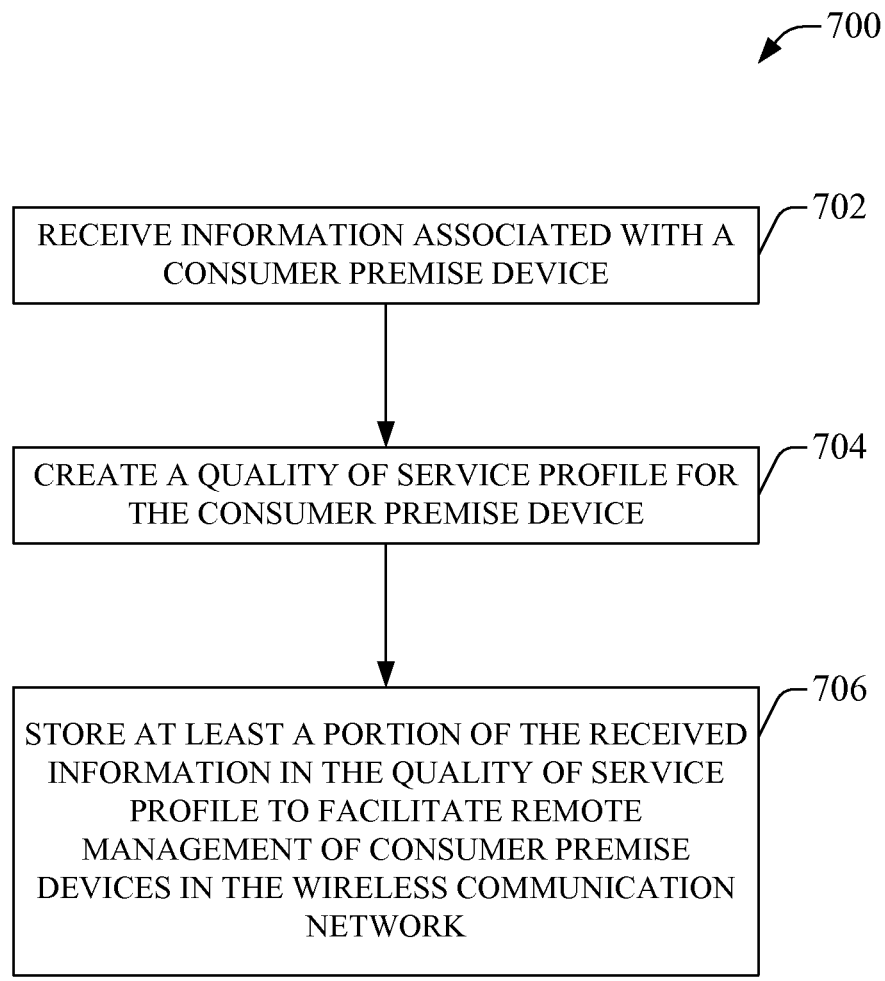
FIG. 7 illustrates a flowchart of an example methodology that can facilitate creating a Quality of Service (QoS) profile(s) for a consumer premise device(s) to facilitate remotely managing consumer premise devices in a wireless communication environment in accordance with an aspect of the disclosed subject matter.

FIG. 7 illustrates a flowchart of an example methodology 700 that can facilitate creating a Quality of Service (QoS) profile(s) for a consumer premise device(s) to facilitate remotely managing consumer premise devices in a wireless communication environment in accordance with an aspect of the disclosed subject matter. At 702, information associated with a consumer premise device (e.g., 202) can be received. In an aspect, the information can comprise information that identifies the consumer premise device 202; information regarding the aggregate service bandwidth requirements, agreed QoS such as minimum bit rate, and/or required QoS for the consumer premise device 202; information regarding communication devices locally connected to the consumer premise device 202, including the particular services being provided, respectively, to the communication devices and associated policy and security assignment; available interfaces (e.g., LAN and WAN) on the consumer premise device 202; and/or other information related to the consumer premise device 202 and associated communication devices.

At 704, a QoS profile can be created for the consumer premise device. In an aspect, the remote management component 208 can facilitate generating a QoS profile for each consumer premise device 202 associated with the communication network platform 206. At 706, the received information, or a portion thereof, can be stored in the QoS profile to facilitate remote management of consumer premise devices in the wireless communication network. In an aspect, the remote management component 208 can store at least a portion of the received information related to the consumer premise device 202 in the QoS profile. At this point methodology 700 can end.

Figure 8:
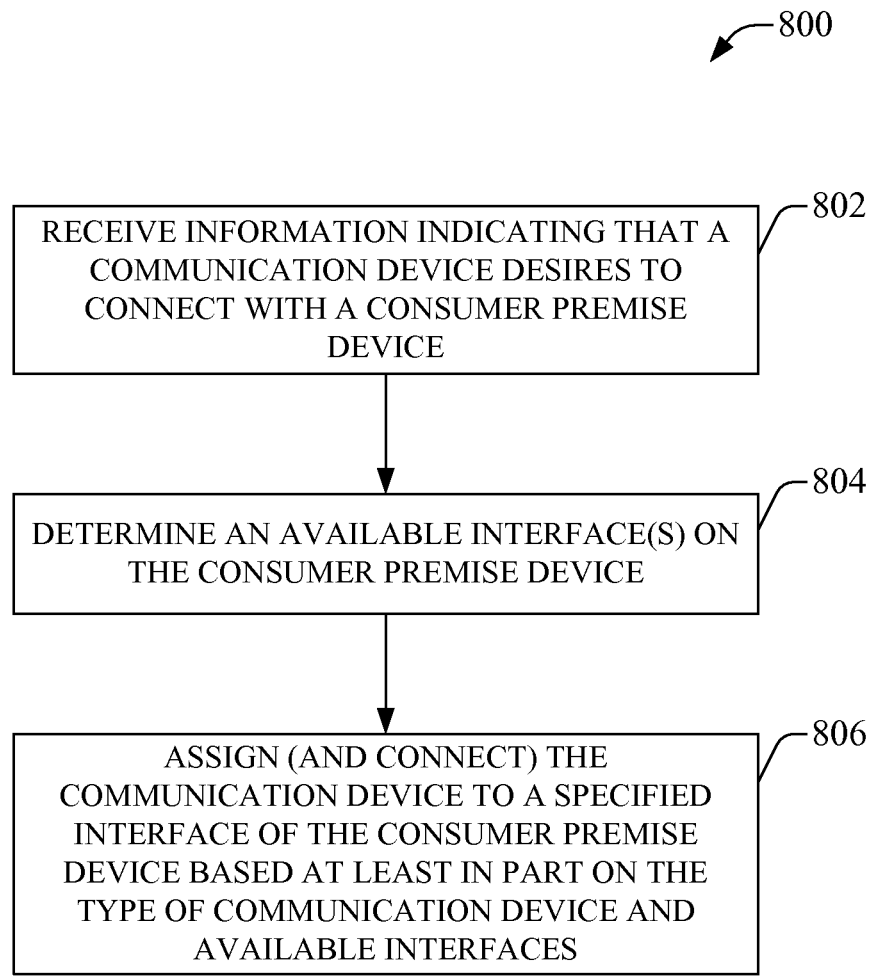
FIG. 8 is a flowchart of an example methodology for assigning communication devices to interfaces of a consumer premise device to facilitate efficient management of consumer premise devices in accordance with an aspect of the disclosed subject matter.

FIG. 8 is a flowchart of an example methodology 800 for assigning communication devices to interfaces of a consumer premise device to facilitate efficient management of consumer premise devices in accordance with an aspect of the disclosed subject matter. At 802, information indicating that a communication device (e.g., $120_A$, $120_B$) desires to connect with a consumer premise device (e.g., 202) can be received. For example, a mobile communication device can enter an area of coverage of a consumer premise device 202 and can desire to communicate in the wireless communication network via a connection to the consumer premise device 202. The consumer premise device 202 can receive information from the mobile communication device that indicates that the mobile communication device desired to connect to the consumer premise device 202. At 804, an available interface(s) on the consumer premise device 202 can be determined. In an aspect, the consumer premise device 202 can determine which of its interfaces are available, and which of its interfaces can be used by the communication device based in part on the type of communication device. For instance, the consumer premise device 202 can determine whether a desired (e.g., preferred, default) interface that is compatible with the communication device is available.

At 806, the communication device can be assigned and connected to a specified interface of the consumer premise device 202 based at least in part on the type of communication device and available interfaces. If the desired interface is available, the consumer premise device 202 can assign and connect the communication device to the desired interface (e.g., iPhone can be assigned to WiFi LAN interface; 3G cellular phone can be assigned to a femto 3G Wireless interface; a PC can be connected to an Ethernet LAN interface). If the desired interface is not available, the consumer premise device 202 can determine an alternate interface that is compatible with the communication device and can assign and connect the communication device to the alternate interface (e.g., if DSL WAN is not available, a communication device can be connected to a femto 3G Wireless interface as WAN for Internet access and VOIP ATA access). At this point, methodology 800 can end.

Figure 9:
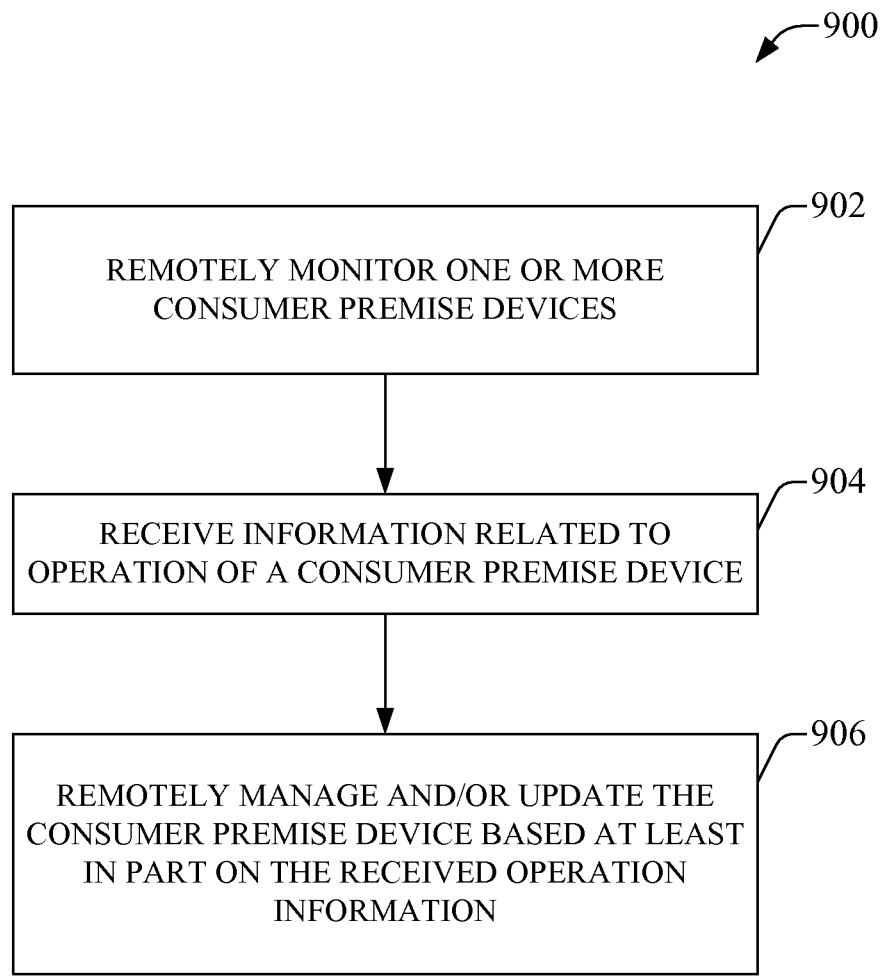
FIG. 9 is a flowchart of an example methodology for receiving periodic updates and/or modification updates from a consumer premise device to facilitate efficient remote management of consumer premise devices in accordance with an aspect of the disclosed subject matter.

FIG. 9 is a flowchart of an example methodology 900 for receiving periodic updates and/or modification updates from a consumer premise device to facilitate efficient remote management of consumer premise devices in accordance with an aspect of the disclosed subject matter. At 902, one or more consumer premise devices (e.g., 202) can be monitored remotely. In an aspect, a communication network platform 206 associated with consumer premise devices 202 and/or macro base stations 204 in a wireless communication network can comprise a remote management component 208 that can monitor the consumer premise device 202. At 904, information related to operation of a consumer premise device 202 can be received. In an aspect, the remote management component 208 can receive information related to operation of the consumer premise device 202 from the consumer premise device 202. The operation information can be received by the remote management component 208 on a periodic basis (e.g., hourly, daily, . . . ) and/or after the consumer premise device 202 is rebooted or has changed its configuration. As desired, the received operation information, or a portion thereof, can be stored in a QoS profile associated with the consumer premise device 202.

At 906, the consumer premise device 202 can be managed and/or updated remotely based at least in part on the received operation information. The remote management component 208 can manage (e.g., adjust a parameter(s)) and/or update the consumer premise device 202 remotely based at least in part on the operation information received from the consumer premise device 202. For example, the remote management component 208 can receive an update indicating that a particular interface on the consumer premise device 202 is defective and unavailable. The remote management component 208 can update the QoS profile of the consumer premise device 202 to indicate that the particular interface is not available. The remote management component 208 can utilize the updated QoS profile to facilitate remote management of the consumer premise device 202. At this point, methodology 900 can end.

Figure 10:
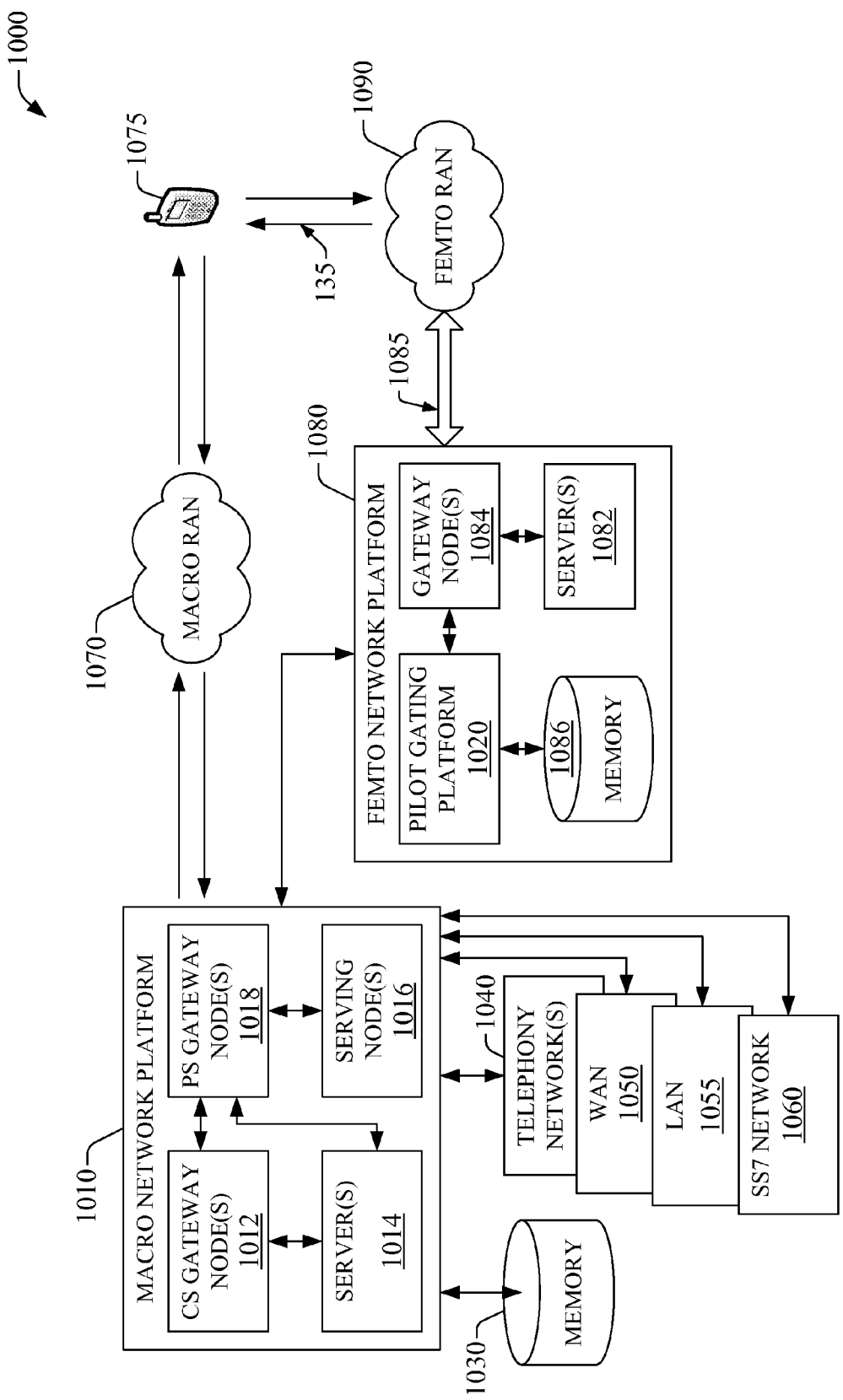
FIG. 10 illustrates an example wireless communication environment in accordance with aspects of the disclosed subject matter described herein.
Figure 11:
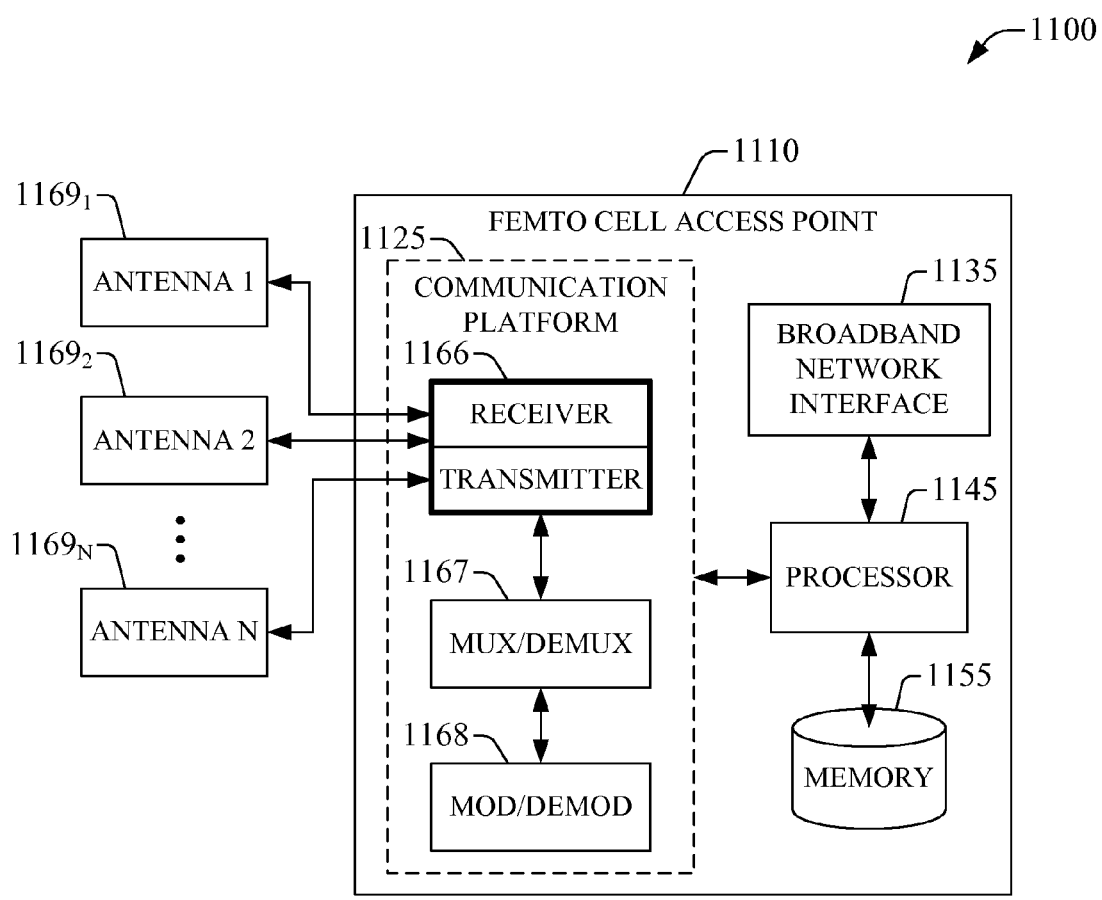
FIG. 11 illustrates a block diagram of an example embodiment of a femto access point that can transmit pilot signal(s) in accordance with aspects described herein.

To provide further context for various aspects of the subject specification, FIGS. 10 and 11 illustrate, respectively, an example wireless communication environment 1000, with associated components for operation of a femtocell, and a block diagram of an example embodiment 1100 of a femto access point which can transmit pilot signal(s) in accordance with aspects described herein.

Wireless communication environment 1000 can include two wireless network platforms: (i) A macro network platform 1010 which serves, or facilitates communication) with user equipment 1075 via a macro radio access network (RAN) 1070. It should be appreciated that in cellular wireless technologies (e.g., 3GPP UMTS, HSPA, 3GPP LTE, 3GPP UMB), macro network platform 1010 can be embodied in a Core Network. (ii) A femto network platform 1080, which can provide communication with UE 1075 through a femto RAN 1090 linked to the femto network platform 1080 via backhaul pipe(s) 1085, wherein backhaul pipe(s) can be substantially the same as backhaul pipe 140. It should be appreciated that femto network platform 1080 typically offloads UE 1075 from macro network, once UE 1075 attaches (e.g., through macro-to-femto handover, or via a scan of channel resources in idle mode) to femto RAN. Also, it is to be appreciated and understood that, in accordance with various embodiments and aspects of the disclosed subject matter, the communication network platform 206 (e.g., as illustrated in FIG. 2 and described herein) can comprise the same or similar functionality as, the macro network platform 1010 and femto network platform 1080, where the communication network platform 206 can facilitate remote management of consumer premise devices 202 comprising hybrid femtocell gateways (e.g., gateway comprising a femtocell access point as well as supporting broadband access), where the consumer premise devices 202 can be associated with the macro RAN 1070 and femto RAN 1090.

It is noted that RAN can include base station(s), or access point(s), and its associated electronic circuitry and deployment site(s), in addition to a wireless radio link operated in accordance with the base station(s). Accordingly, macro RAN 1070 can comprise various coverage cells like cell 105, while femto RAN 1090 can comprise multiple femtocell access points (e.g., as contained in a consumer premise device 130, 202). As mentioned above, it is to be appreciated that deployment density in femto RAN 1090 can be substantially higher than in macro RAN 1070.

Generally, both macro and femto network platforms 1010 and 1080 can include components, e.g., nodes, gateways, interfaces, servers, or platforms, that can facilitate both packet-switched (PS) (e.g., internet protocol (IP), frame relay, asynchronous transfer mode (ATM)) and circuit-switched (CS) traffic (e.g., voice and data) and can control generation for networked wireless communication. In an aspect of the subject innovation, macro network platform 1010 can include CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1112 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 can interface CS-based traffic and signaling and gateway node(s) 1018. As an example, in a 3GPP UMTS network, a gateway node(s) can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; and local area network(s) (LANs) 1055 also can be interfaced with macro network platform 1010 through gateway node(s) 1018. Gateway node(s) 1018 can generate packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that can convey the various packetized flows of information, or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 can store information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, LAN(s) 1055, or SS7 network 1060.

Regarding femto network platform 1080, the femto network platform 1080 can include pilot gating platform 1020. While illustrated as external to femto gateway node(s) 1084, it should be appreciated that pilot gating platform 1020 can be an integral part of gateway node(s) 1084.

Femto gateway node(s) 1084 can comprise substantially the same functionality as PS gateway node(s) 1018. Additionally, femto gateway node(s) 1084 can also include substantially all or a desired portion of the functionality of serving node(s) 1016. In an aspect, femto gateway node(s) 1084 can facilitate handover resolution, e.g., assessment, and execution.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example, operational information that can be stored in memory 1086 can comprise, but is not limited to, subscriber information; contracted services; maintenance and service records; femtocell configuration (e.g., pilot gating schedule(s), attachment data, devices served through femto RAN 1090, access control lists, or white lists); service policies and specifications; privacy policies; add-on features; and so forth.

With respect to FIG. 11, in example embodiment 1100, femtocell AP 1110 can receive and transmit signal(s) (e.g., traffic and control signals) from and to wireless devices, access terminals, wireless ports and routers, etc., through a set of antennas $1169_1$-$1169_N$. It should be appreciated that while antennas $1169_1$-$1169_N$ are a part of communication platform 1125, which comprises electronic components and associated circuitry that provides for processing and manipulating of received signal(s) (e.g., a packet flow) and signal(s) (e.g., a broadcast control channel) to be transmitted. In an aspect, communication platform 1125 includes a transmitter/receiver (e.g., a transceiver) 1166 that can convert signal(s) from analog format to digital format upon reception, and from digital format to analog format upon transmission. In addition, receiver/transmitter 1166 can divide a single data stream into multiple, parallel data streams, or perform the reciprocal operation. Coupled to transceiver 1166 is a multiplexer/demultiplexer 1167 that facilitates manipulation of signal in time and frequency space. Electronic component 1167 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1167 can scramble and spread information (e.g., codes) according to substantially any code known in the art; e.g., Hadamard-Walsh codes, Baker codes, Kasami codes, polyphase codes, and so on. A modulator/demodulator 1168 is also a part of operational group 1125, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1110 also includes a processor 1145 configured to confer functionality, at least partially, to substantially any electronic component in the femto access point 1110, in accordance with aspects of the subject innovation. In particular, processor 1145 can facilitate femto AP 1110 to implement configuration instructions received through communication platform 1125, which can include storing data in memory 1155. In addition, processor 1145 facilitates femto AP 1110 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1145 can manipulate antennas $1169_1$-$1169_N$ to provide distinct pilot signal gating; facilitate beamforming or selective radiation pattern formation, which can benefit specific locations (e.g., basement, home office, . . . ) covered by femto AP; and exploit substantially any other advantages associated with smart-antenna technology. Memory 1155 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1155 can store configuration information such as schedules (e.g., gating schedule(s)) and policies; femto AIP address(es) or geographical indicator(s); access lists (e.g., white lists); license(s) for utilization of add-features for femto AP 1110, and so forth.

In embodiment 1100, processor 1145 is coupled to the memory 1155 in order to store and retrieve information necessary to operate and/or confer functionality to communication platform 1125, broadband network interface 1135 (e.g., a broadband modem), and other operational components (e.g., multimode chipset(s), power supply sources . . . ; not shown) that support femto access point 1110.

It is to be noted that aspects, features, or advantages of the subject innovation described in the subject specification can be exploited in substantially any wireless communication technology. For instance, Wi-Fi, WiMAX, Enhanced GPRS, 3GPP LTE, 3GPP2 UMB, 3GPP UMTS, HSPA, or Zigbee. Additionally, substantially all aspects of the subject innovation as disclosed in the subject specification can be exploited in legacy telecommunication technologies; e.g., GSM.

In addition, it is to be noted that the various aspects disclosed in the subject specification can also be implemented through (i) program modules stored in a computer-readable storage medium or memory (e.g., memory 1086 or memory 1155) and executed by a processor (e.g., processor 1145), or (ii) other combination(s) of hardware and software, or hardware and firmware. Also, it is to be appreciated and understood that, in accordance with various embodiments and aspects of the disclosed subject matter, a consumer premise device 202 (e.g., as illustrated in FIG. 3 and described herein) can comprise a hybrid femtocell gateway (e.g., gateway comprising a femtocell AP as well as supporting broadband access), which can include a femto AP, such as femtocell AP 1110.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method for remotely managing a femtocell access point in a wireless communication network, comprising:
   maintaining, by a system including a processor, a type and a quality of service profile for a communication device and interface information representing a plurality of interfaces associated with a femtocell access point and a type and quality of service profile for a communication device representing types and quality of service of communication devices allowed to connect to the plurality of interfaces;

remotely assigning, by the system, the communication device to a selected interface of the plurality of interfaces based on the interface information and a type of the communication device represented by the type and quality of service profile, the interface information further defining an alternate interface, of the plurality of available interfaces, to which the communication device is to be assigned in reponse to a determination that the selected interface is not available;

remotely monitoring, by the system, operational information associated with the femtocell access point via a network service; and remotely controlling, by the system via the network service, a parameter associated with the femtocell access point based on the operational information, the interface information, and a defined criterion.

2. The method of claim 1, wherein the remotely monitoring the operational information includes remotely monitoring a channel signal-to-noise ratio associated with the femtocell access point.

3. The method of claim 1, further comprising:
remotely evaluating, by the system, the operational information employing a remote manager;
determining, by the system employing the remote manager, that the operational information is not in accordance with system specifications associated with the wireless communication network; and
remotely adjusting, by the system, the parameter via the network service based at least in part on the defined criterion in response to the determining.

4. The method of claim 1, wherein:
the remotely monitoring the operational information includes remotely monitoring interference between the femtocell access point and a neighboring cell, and
the remotely controlling the parameter includes remotely adjusting transmit power of the femtocell access point in response to determining that the interference meets a condition.

5. The method of claim 1, further comprising:
remotely measuring, by the system, a signal-to-noise ratio associated with a communication device in communication with the femtocell access point;
calculating, by the system, a channel capacity associated with the femtocell access point based at least in part on the signal-to-noise ratio;
determining, by the system, a location of the communication device; and
determining, by the system, whether to hand off the communication device to a cell associated with a macro base station based at least in part on the signal-to-noise ratio, the channel capacity, and the location of the communication device.

6. The method of claim 5, further comprising:
remotely maintaining, by the system, a location registry database that includes geographical location information of a neighboring macro base station relative to the femtocell access point; and
determining, by the system, whether to hand off the communication device to the neighboring macro base station based on the geographical location information and the channel capacity.

7. The method of claim 1, wherein the remotely monitoring the operational information includes remotely monitoring a transmit power of the femtocell access point.

8. The method of claim 1, further comprising:
updating, by the system, the quality of service profile associated with the femtocell access point based at least in part on the operational information.

9. The method of claim 8, wherein the updating includes updating the quality of service profile based on information specifying an aggregate service bandwidth requirement for the femtocell access point.

10. A system that facilitates remote management of a femtocell access point in a wireless communication network, comprising:
a memory storing computer-executable instructions; and
a processor communicatively coupled to the memory that facilitates execution of the computer-executable instructions to at least:
maintain interface information identifying a plurality of available interfaces associated with a femtocell access point,
assign a communication device to a selected interface of the plurality of available interfaces based at least in part on the interface information and a type of the communication device according to a profile, maintained by a remote management component, that defines which of the plurality of available interfaces are associated with the type and a quality of service profile of the communication device, maintained by the remote management component, associated with the consumer premise device, and further defines an alternate interface, of the plurality of available interfaces, to which the communication device is to be assigned in response to a determination that the selected interface is not available; and
remotely monitor performance data associated with the femtocell access point over a network service, and
remotely control a parameter of the femtocell access point via the network service based at least in part on the performance data, the interface information, and a predetermined criterion.

11. The system of claim 10, wherein the predetermined criterion relates to a threshold level for the performance data.

12. The system of claim 10, wherein the predetermined criterion relates to an acceptable level of interference between the femtocell access point and a neighboring cell.

13. The system of claim 10, wherein the processor further facilitates the execution of the computer-executable instructions to measure the performance data and determine whether the performance data is in accordance with a specification related to the wireless communication network.

14. The system of claim 13, wherein the processor further facilitates the execution of the computer-executable instructions to remotely modify the parameter in response to a determination that the performance data is not in accordance with the specification.

15. The system of claim 10, wherein the performance data comprises a channel signal-to-noise ratio associated with the femtocell access point.

16. The system of claim 10, wherein the processor further facilitates the execution of the computer-executable instructions to remotely measure a signal-to-noise ratio of a mobile communication device for which the femtocell access point acts as a cell, calculate a channel capacity of the femtocell access point based at least in part on the signal-to-noise ratio, and determine whether the mobile communication component is to be handed off from the femtocell access point to a different cell based on the signal-to-noise ratio and the channel capacity.

17. The system of claim 10, wherein the processor further facilitates the execution of the computer-executable instructions to employ a remote control that modifies a transmit power associated with the femtocell access point in accordance with the performance data and the predetermined criterion.

18. The system of claim 10, wherein the quality of service profile defines a radio frequency spectral setting and a quality of service policy for the femtocell access point, and the processor further facilitates the execution of the computer-executable instructions to remotely control the parameter in accordance with the quality of service profile.

19. The system of claim 18, wherein the processor further facilitates the execution of the computer-executable instructions to maintain the interface information in the quality of service profile.

20. The system of claim 10, wherein the processor further facilitates the execution of the computer-executable instructions to maintain device information that identifies one or more communication devices, including the communication device, respectively connected to the available interfaces.

21. The system of claim 10, wherein the profile further defines an alternate interface, of the plurality of available interfaces, to which the communication device is to be assigned in response to a determination that the selected interface is not available.

22. The system of claim 10, wherein the plurality of available interfaces includes at least a Wi-Fi local area network interface, a third generation wireless interface, and an Ethernet local area network interface.

23. A non-transitory computer-readable medium having computer-executable instructions stored thereon that, in response to execution, cause a computing system including a processor to perform operations, including:
    storing a type and a quality of service profile associated with a communication device and interface information identifying available interfaces of a femtocell access point and a set of respective types of communication devices permitted to connect to the available interfaces;
    remotely assigning the communication device to an interface, of the available interfaces, based on the type and quality of service profile, wherein the interface information defines an alternate interface, of the available interfaces, to which the communication device is to be assigned in response to a determination that the interface is not available;
    remotely monitoring operational information related to the femtocell access point using a network service; and
    remotely controlling, via the network service, a parameter associated with the femtocell access point based at least in part on a defined criterion and the interface information.

24. The non-transitory computer-readable medium of claim 23, wherein the remotely monitoring the operational information includes remotely monitoring a channel signal-to-noise ratio associated with the femtocell access point.

25. The non-transitory computer-readable medium of claim 23, wherein:
    the remotely monitoring the operational information includes remotely monitoring interference between the femtocell access point and a cell neighboring the femtocell access point; and
    the remotely controlling the parameter includes remotely adjusting transmit power of the femtocell access point in response to determining that the interference meets a condition.

* * * * *